(No Model.)
W. H. ROEHM.
TWINE REEL.
No. 520,189.        Patented May 22, 1894.
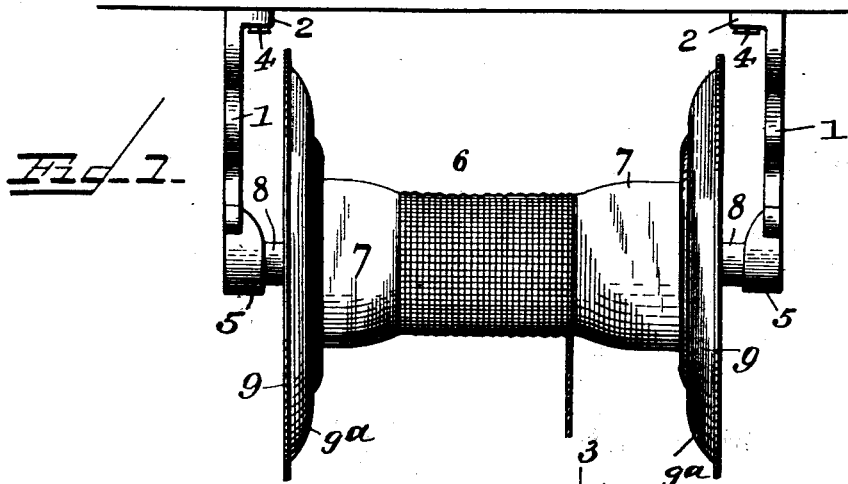
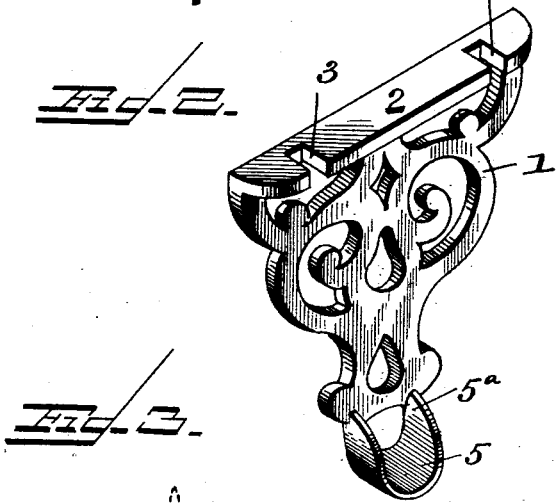
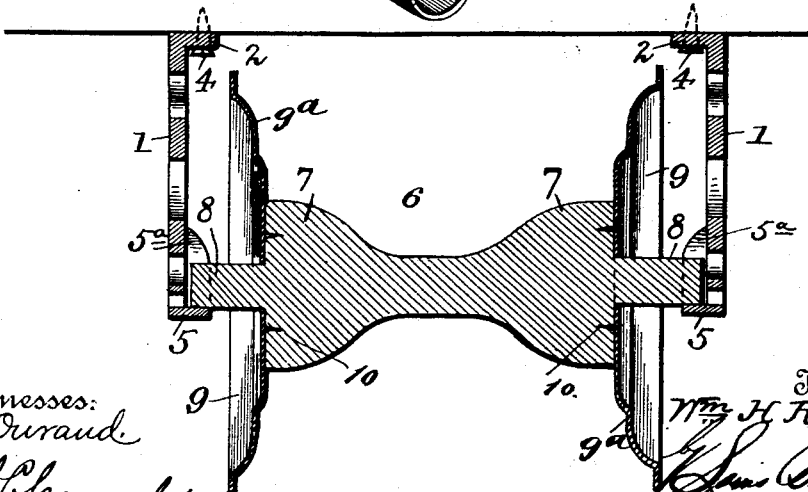
Witnesses:
F. L. Ouraud
Jo. L. Coombs
Inventor:
Wm. H. Roehm,
by Lewis Bagger & Co.
Attorneys.

UNITED STATES PATENT OFFICE.

WILLIAM HENRY ROEHM, OF PORTAGE, ASSIGNOR OF TWO-THIRDS TO FRANK AUGUST ROEHM, OF DURAND, AND A. H. TONGEN, OF RIO, WISCONSIN.

TWINE-REEL.

SPECIFICATION forming part of Letters Patent No. 520,189, dated May 22, 1894.

Application filed February 14, 1893. Serial No. 462,300. (No model.)

*To all whom it may concern:*

Be it known that I, WILLIAM HENRY ROEHM, a citizen of the United States, and a resident of Portage, in the county of Columbia and State of Wisconsin, have invented certain new and useful Improvements in Twine-Reels; and I do hereby declare that the following is a full, clear, and exact description of the invention, which will enable others skilled in the art to which it appertains to make and use the same, reference being had to the accompanying drawings, which form a part of this specification.

My invention relates to improvements in cord or twine-holders for use in stores and other places, of that type in which a spool or reel containing cord or twine is journaled in depending brackets secured to a ceiling in such a position that the free end of the cord or twine will be within convenient reach of the person desiring to use the same; and my improvement consists in the novel construction and combination of parts of a device of that class as will be hereinafter more fully described and claimed.

In the accompanying drawings: Figure 1 is an elevation of a twine or cord holder constructed in accordance with my invention. Fig. 2 is a perspective view of one of the brackets, detached; and Fig. 3 is a longitudinal sectional view through the axis of the reel or bobbin with its brackets.

Like numerals of reference denote corresponding parts in all the figures.

In the said drawings, the reference numeral 1 designates two brackets, each consisting of a metal casting having an inwardly extending flange 2 at the upper end, which flanges abut against the ceiling and are formed with slots 3 on their inner faces, to receive screws 4, by which they are adjustably secured in place. By loosening these screws, the brackets may be moved laterally to the right or left, to accommodate different-sized reels. At their lower ends, the brackets are cast with inwardly extending curved flanges 5, having beveled or sloping upper ends 5ª; said curved flanges forming the bearings for the journals of the reel or spool. The latter consists of a wooden spool or spindle, 6, of the peculiar shape shown in the drawings, i. e., it is recessed or hollowed at its middle part so as to form enlarged hubs 7 at both ends. It is also turned with a short journal 8 at each end, which is integral with the spool and rests in the bearings of the brackets. At each end the spindle is provided with disks or heads 9, stamped from sheet-metal and provided with central apertures for the insertion of the wooden journals 8. These disks are secured to the hubs of the spindle by tacks 10, driven through the thin metal of the disks into the enlarged flat ends of the wooden hubs.

By this specific construction I produce a very strong and serviceable spool at small cost. The wooden spindle is turned in a lathe, in one piece with its journals 8; the enlarged hubs 7, with their flat outer sides, providing for the easy attachment of the metallic end disks 9, which confine the twine upon the spool when the same is wound full. As the twine is gradually unwound, the shape of the spool, with its recessed middle part, will cause the twine to draw from the middle of the spool so as to unwind easily, and this shape also facilitates the winding or filling of the spool by causing the layers or coils of twine to draw close together sidewise, without overlapping, as shown in Fig. 1. The metallic end disks 9 are stamped or spun up from sheet-metal into dish-shapes, as clearly shown on the drawings, with beveled rims, as shown at 9ª; and this is an important feature as it gives the disks, forming the ends of the spool between which the twine is confined, the necessary strength and rigidity to resist the lateral strain, or inside pressure, of the body of twine. If these ends were simply flat circular metal disks, they would be apt to bend or collapse in handling the spool, unless they were made of considerable thickness, which would add both to the expense and weight of the spool. By making them of a dish-shape, they may be spun up from very thin sheet-metal and yet possess the necessary strength and rigidity to stand rough handling.

The operation of this device will be readily understood: The brackets are secured to the ceiling at the proper distance apart. The reel or spool, with the cord or twine wound thereon, is then inserted between the brackets, and the journals fitted in the bearings in the lower ends thereof. It will thus be seen that the spool or reel is rotatable in the brackets, so that the person using the cord or twine can readily unwind the quantity or length required, by simply pulling upon the free end.

It is my intention, in practice, to sell the spools or reels to the trade with the cord or twine wound thereon, as an empty spool can be quickly removed, and a full one substituted for it, without interfering with the brackets.

Having thus described my invention, I claim and desire to secure by Letters Patent of the United States—

As an improved article of manufacture, the herein described reel comprising the wooden body or spool 6, recessed at its middle part to form enlarged ends or hubs 7, said hubs being reduced to form the integral wooden journals or trunnions 8, and the metallic disk shaped heads or ends 9, spun or struck up to form the beveled circular reinforcing flanges $9^a$, as and for the purpose specified.

In testimony that I claim the foregoing as my own I have hereunto affixed my signature in presence of two witnesses.

WILLIAM HENRY ROEHM.

Witnesses:
ALBERT S. COUCH,
A. W. KERR.